UNITED STATES PATENT OFFICE 2,492,012

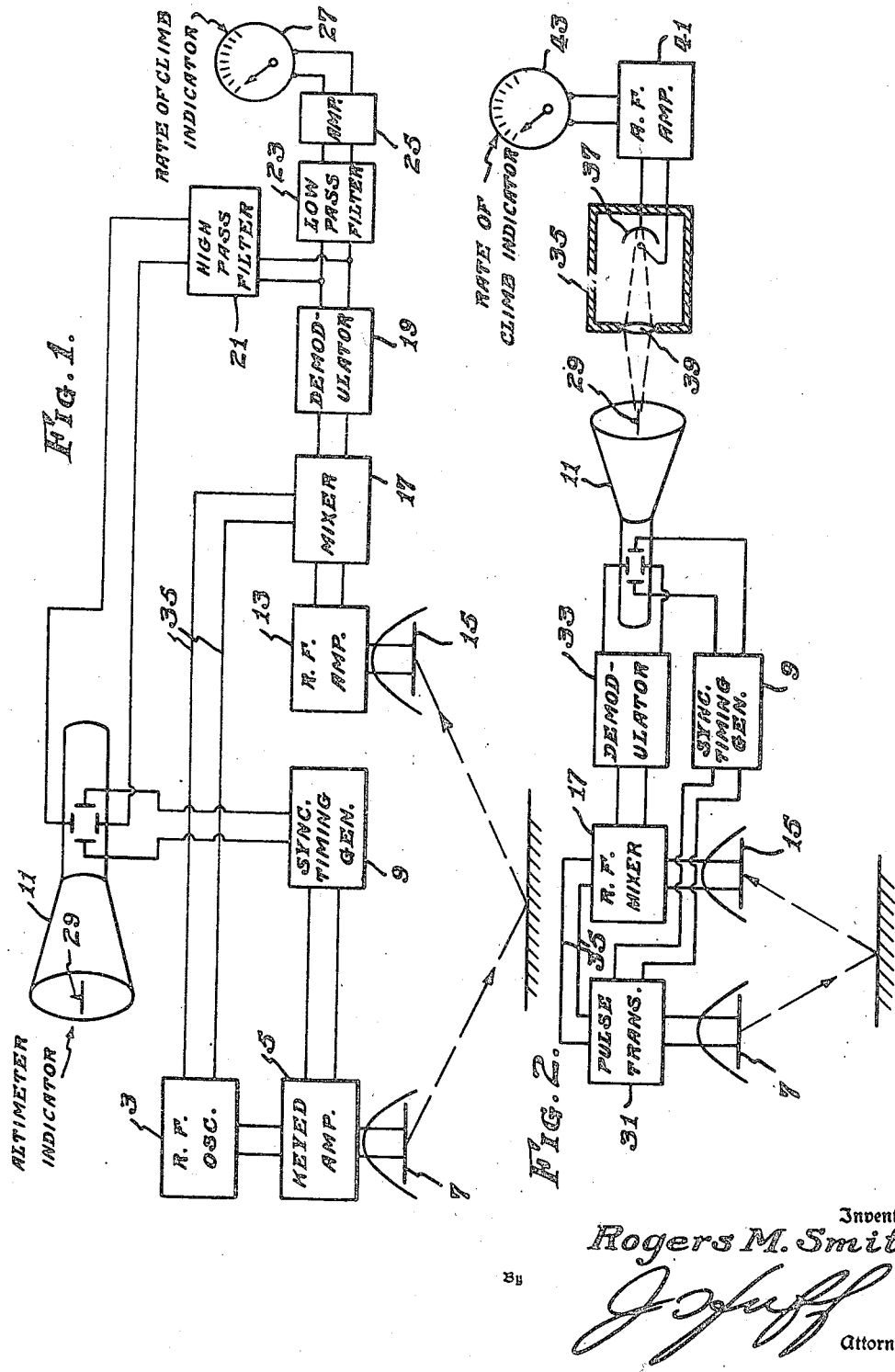

RADIO FREQUENCY SYSTEM FOR ALTITUDE OR DISTANCE MEASUREMENT

Rogers Marsh Smith, Merchantville, N. J., assignor to Radio Corporation of America, a corporation of Delaware Application September 1, 1939, Serial No. 293,133

3 Claims. (Cl. 343—9)

This invention relates to indicators of the type used to determine the distance of one object from another object, one of which may be moving, and the rate of change in this distance. The invention is particularly adapted for use and will be explained in connection with a device for indicating the altitude of an aircraft and for indicating the rate of change in altitude of the aircraft.

Among the objects of this invention are the provision of a rate-of-climb indicator; the provision of a simplified combined altimeter and rate-of-climb indicator; the provision of means for converting an existing altimeter of the reflected pulse type to provide a rate-of-climb indication; the provision of means for modifying a pulse-type altimeter to provide additional useful information; and the provision of means for photoelectrically viewing the cathode ray indicator of a pulse altimeter to obtain information by which the rate of change of altitude may be determined.

A system has been proposed for use on moving vehicles such as aircraft, or the like, by means of which the distance of the craft from another object, or from the ground, may be determined by measuring the time required for a short pulse of ultra high frequency energy to travel from the aircraft to the ground and back again. In accordance with this invention, such a system is modified by mixing a reference current with the received pulses to produce a resultant the frequency of which is proportional to the rate of change in the length of the path traveled by the received pulse. The resultant current is a heterodyne generally of low audio frequency which is used to actuate a suitable audio frequency meter. An alternative embodiment of this invention modifies the usual pulse cathode ray indicator by mixing a radio frequency reference current with the received impulse, and utilizes a photoelectric tube to view the cathode ray indicator and produce an alternating current the frequency of which is proportional to the rate of change of the length of the path traveled by the reflected pulse.

This invention will be better understood from the following description when considered in connection with the accompanying drawings in which Figure 1 is a block diagram of a preferred form of this invention, and Figure 2 is a block diagram of an alternative form embodying a photoelectric tube.

Referring to Figure 1, 3 is an ultra high radio frequency oscillator operating at approximately 500 megacycles. The frequency of this oscillator is preferably stabilized in any well-known manner to prevent its drifting in the presence of changes in temperature and pressure. The output of the oscillator 3 is impressed on a keyed amplifier 5. This amplifier is any well-known radio frequency amplifier which may be keyed off and on at a high frequency, hereinafter called the "pulse frequency," to cause extremely short pulses of radio frequency energy to be applied to the antenna 7.

As is well known, the pulses must be so short that each pulse is completely radiated in a time which is substantially less than that required for the pulse to travel outwardly along its path and be reflected back to the receiver. The pulse frequency may be, for example, approximately 50,000 cycles per second. The duration of each pulse is preferably of the order of one ten-millionth of a second.

The pulse frequency which is utilized to modulate the amplifier 5 is also used to control a synchronized timing generator 9 the output of which is a saw-tooth voltage which is utilized to deflect the electron beam of a cathode ray tube 11. By this means, the cathode ray is caused to draw a horizontal line on the cathode ray screen, the time at which the beam deflection begins corresponding to the time at which each pulse is radiated. The saw-tooth timing voltage causes the cathode ray to move across the fluorescent screen during the full period between successive pulses.

A receiver is likewise mounted in the aircraft, and is provided with a directional antenna 15 adapted to receive pulses which are reflected from the ground. The receiver includes a tuned radio frequency amplifier 13 the output of which is impressed on a mixer 17. The mixer consists of a multigrid tube, one grid of which has impressed on it the radio frequency voltage derived from the amplifier 13, and another grid of which has impressed on it a constant radio frequency voltage, derived, for example, by means of a connection 35 from the radio frequency oscillator 3.

The resultant or combined voltage is impressed on a demodulator 19, which may be a diode rectifier or the like. If desired, a local oscillator and an intermediate frequency amplifier may precede the demodulator 19. The rectified output voltage from the demodulator 19 is impressed on the input of two filters. The first, 21, is a high pass filter, designed to pass the 50,000-cycle impulse frequency component, The second is a low pass filter 23 designed to pass low frequency currents in the audio frequency range, and to attenuate the high frequency currents. The output of the high pass filter 21 is connected to the vertical deflecting plates of the cathode ray indicator 11. The output of the low pass filter 23 may include an amplifier 25, and is connected to any suitable indicator such as a frequency meter 27.

The operation of this invention will now be described: At the instant the first pulse is radiated from antenna 7, the cathode ray starts moving horizontally across the fluorescent screen. The pulse travels downwardly from the aircraft, is reflected from the earth's surface, and is subsequently received by the antenna 15. As a result, after being amplified through amplifier 13, detected and filtered, a pulse is impressed between the vertical deflecting plates of the cathode ray tube causing the beam to be deflected vertically and producing a visible line 29 for a brief instant corresponding approximately to the time length of the transmitted pulse. Successive pulses are transmitted at successive intervals, and, since the timing generator is synchronized to the pulse frequency, the vertical lines 29 which are successively made occur at the same spot on the screen. Their relative position on the scanning line indicates the altitude of the aircraft.

In accordance with this invention, a constant frequency radio frequency reference current is applied to the mixer 17 from the oscillator 3 and is combined with the received pulses. At the operating carrier frequency, a wave length is equal, roughly, to two feet. Consequently, if the altitude of the aircraft changes by one foot the length of the path of the reflected impulse is changed by two feet, which is one wave length. Therefore, a change of altitude of one foot causes the phase of the carrier frequency to vary through 360°.

It is well known that the phase of a radiated radio frequency voltage, with respect to a fixed or reference voltage of like frequency, varies as the length of the radiation path is changed. By comparing the radio frequency phase of the received impulse with the reference voltage derived from the oscillator, the output of the mixer 17 varies between a maximum and a minimum value, as the length of the path traveled by the reflected pulse varies through successive wavelengths. The frequency of this variation is a modulation frequency, and is a measure of the rate of change of the length of the reflected path, and hence it is a measure of the rate of change of altitude of the aircraft, known as the "rate of climb."

The demodulator 19 produces a rectified component the frequency of which is proportional to the modulation frequency of the mixer output. There is, in addition, a modulation component of the pulse frequency but, since the pulse frequency is a great deal higher than the modulation component produced by the motion of the aircraft with respect to the ground, the two may readily be separated by means of the filters 21 and 23. The high frequency pulses deflect the cathode ray, while the low frequency modulation is indicated by the frequency meter 27, which is calibrated to indicate rate of change of altitude.

Referring now to Figure 2, a modification is shown which is adapted for use in conjunction with existing pulse-type altimeter installations. An addition to the existing installation is necessary, however, to provide a modulation component proportional to the rate of change of altitude of the aircraft.

The pulse transmitter 31 includes both the oscillator 3 and keyed amplifier 5 of Figure 1. The synchronized timing generator 9 is the same as that shown in the preceding figure. The receiver includes a radio frequency mixer 17 which is connected to a demodulator 33. The modification required comprises the installation of a connection 35 between the carrier frequency oscillator in the transmitter 31 and the receiver, either in the manner shown in Figure 1, or by mixing the two voltages in the R.-F. mixer 17, as shown in Figure 2. The purpose of this is to provide a reference frequency current to produce the audio frequency current component which is a function of the rate of change of the radio frequency phase of received pulses.

A cathode ray tube 11 having a screen with low retentivity is utilized as before to indicate the altitude of the aircraft with respect to the ground. Also, as before, a vertical line 29 is produced by the received pulses. In this instance, however, the amplitude of the vertical line 29 varies at a rate which depends upon the rate of change of altitude. If the aircraft is flying in an absolutely level plane over flat terrain, the amplitude of the vertical line will remain constant.

In order to translate the amplitude variations of the vertical line 29 into an indication which may be used to determine the rate of climb of the aircraft, the fluorescent screen of the cathode ray tube 11 is focused on a photocell tube 37 which is located within an enclosed box 35 having an aperture which may include a lens 39. The photoelectric tube 37 is connected to an audio frequency amplifier 41, the output of which is used to energize a frequency meter 43 of any suitable type.

The operation of the modification illustrated in Figure 2 is generally similar to that of the arrangement illustrated in Figure 1. However, the two filters 21 and 23 of Figure 1 are no longer necessary, since the low frequency variations of the pulse amplitude are permitted to be impressed on the cathode ray tube. The low frequency fluctuations of the vertical line which is used to indicate altitude are not objectionable, however, since they occur at a fairly rapid rate under normal circumstances due to changes in the nature of the terrain over which the plane is flying. The photoelectric tube 37 converts the flicker or amplitude variation of the indicating line on the altimeter screen into an audio frequency pulse the frequency of which is a measure of the change in altitude of the aircraft.

While I have illustrated a direct connection 35 between the radio frequency oscillator and the R.-F. mixer 17, it is to be understood that under certain circumstances sufficient direct radiation may be present to provide a mixing signal in the receiver without the necessity of a connecting lead. The means by which the constant radio frequency signal is applied to the receiver is not important, so long as a signal of sufficient amplitude is provided to produce the desired beat with the received impulses. While I have described this invention in connection with its use as an altimeter and rate-of-climb indicator when installed on an aircraft, it is to be understood that the system may be used on the ground to measure the distance and speed of aircraft or vehicles moving on the ground.

I claim as my invention:

1. In a device of the character described, a pulse modulated ultra high frequency transmitter, a source of ultra-high frequency reference current of like frequency an ultra high frequency receiver adjacent said transmitter responsive to transmitted pulses reflected from an object at a distance from said transmitter, said receiver including means for combining said received pulses with said ultra-high frequency reference current to produce a resultant current having a first modulation component equal to the pulse modulation frequency and a second component the frequency of which is proportional to the rate of change of the distance between said transmitter and said object, a cathode ray tube responsive to said first modulation component for indicating the reception of each of said pulses, said second modulation component being superimposed on said cathode ray indication, and means responsive to the variations of said cathode ray indication for indicating the frequency of said second modulation component.

2. A device of the character described in claim 1 in which said means responsive to the variation of said cathode ray indication includes a photoelectric device.

3. A device of the character described in claim 1 in which said means responsive to the variation of said cathode ray indication comprises a photoelectric device and a frequency meter.

ROGERS MARSH SMITH.

REFERENCES CITED

The following references are of record in the file of this patent:

UNITED STATES PATENTS

| Number | Name | Date |
| --- | --- | --- |
| 2,045,071 | Espenschied | June 23, 1936 |
| 2,143,035 | Smith | Jan. 10, 1939 |
| 2,412,631 | Rice | Dec. 17, 1946 |
| 2,423,023 | Hershberger | June 24, 1947 |